United States Patent
Richards

(10) Patent No.: US 11,911,662 B1
(45) Date of Patent: Feb. 27, 2024

(54) METHOD TO USE SENSORS FOR GAMES OF SKILL

(71) Applicant: Wunup LLC, Argusville, ND (US)

(72) Inventor: Blake Richards, Argusville, ND (US)

(73) Assignee: Wunup LLC, Argusville, ND (US)

( * ) Notice: Subject to any disclaimer, the term of this patent is extended or adjusted under 35 U.S.C. 154(b) by 0 days.

(21) Appl. No.: 18/058,250

(22) Filed: Nov. 22, 2022

Related U.S. Application Data

(60) Division of application No. 17/559,419, filed on Dec. 22, 2021, now abandoned, which is a continuation of application No. 17/548,735, filed on Dec. 13, 2021.

(51) Int. Cl.
*A63B 24/00* (2006.01)

(52) U.S. Cl.
CPC .. *A63B 24/0084* (2013.01); *A63B 2024/0068* (2013.01); *A63B 2220/17* (2013.01); *A63B 2220/836* (2013.01); *A63B 2225/15* (2013.01); *A63B 2225/20* (2013.01)

(58) Field of Classification Search
CPC ........ A63B 24/0084; A63B 2024/0068; A63B 2220/17; A63B 2220/836; A63B 2225/15; A63B 2225/20
See application file for complete search history.

(56) References Cited

U.S. PATENT DOCUMENTS

| | | | |
|---|---|---|---|
| 6,413,191 B1 | 7/2002 | Harris et al. | |
| 8,460,099 B2 | 6/2013 | Barclay et al. | |
| 8,708,791 B2 | 4/2014 | Nguyen et al. | |
| 8,840,460 B2 | 9/2014 | Chim | |
| 9,489,798 B2 | 11/2016 | Fine et al. | |
| 9,619,965 B1 | 4/2017 | Hill | |
| 9,619,967 B2 | 4/2017 | Fine et al. | |
| 9,904,254 B1* | 2/2018 | Hariri | G04G 9/0064 |
| 10,586,420 B1 | 3/2020 | Bagherzadeh et al. | |
| 10,933,319 B2 | 3/2021 | Lockton | |
| 2003/0119576 A1 | 6/2003 | Mcclintic et al. | |
| 2005/0003878 A1 | 1/2005 | Updike | |
| 2008/0182724 A1 | 7/2008 | Guthrie | |
| 2011/0294581 A1* | 12/2011 | Abe | A63F 13/52 463/43 |
| 2014/0135084 A1 | 5/2014 | Venkat et al. | |
| 2016/0004409 A1* | 1/2016 | Katz | G07F 17/3225 463/25 |
| 2017/0164321 A1 | 6/2017 | Qiu | |
| 2019/0050943 A1* | 2/2019 | Conradie | G06V 40/70 |
| 2019/0076727 A1 | 3/2019 | Morris | |
| 2019/0180571 A1 | 6/2019 | Filipour | |
| 2021/0052976 A1 | 2/2021 | Anderson | |
| 2021/0150854 A1 | 5/2021 | Nguyen | |
| 2021/0209897 A1 | 7/2021 | Seaton | |
| 2021/0236039 A1 | 8/2021 | Saleh | |

(Continued)

*Primary Examiner* — Scott C Anderson
(74) *Attorney, Agent, or Firm* — Merchant & Gould P.C.

(57) ABSTRACT

This application discloses a method to use sensors for games of skill relating to physical exercise. The method may employ the use of sensors that can collect data, including location using GPS, sense barometric pressure, steps walked, blood oxygen levels, navigational directions, gyroscopic movement, heart rate, and many other data types. Players may challenge other players to competitions wherein the players make a challenge wherein a winning player is rewarded a wager. Data collected by the sensors may be used for metrics to determine the winning player.

10 Claims, 10 Drawing Sheets

(56) References Cited

U.S. PATENT DOCUMENTS

| | | | |
|---|---|---|---|
| 2021/0312767 A1 | 10/2021 | Gupta | |
| 2021/0312887 A1 | 10/2021 | Griswold | |
| 2021/0387071 A1* | 12/2021 | Miller | A63B 24/0062 |
| 2022/0046089 A1* | 2/2022 | Adams | G06F 3/04886 |
| 2022/0086246 A1* | 3/2022 | Chen | G06F 9/54 |
| 2022/0390905 A1* | 12/2022 | Franzi | G04G 17/045 |

\* cited by examiner

METHOD TO USE SENSORS FOR GAMES OF SKILL

CROSS-REFERENCE TO RELATED APPLICATION(S)

This application is a Divisional of U.S. application Ser. No. 17/559,419, filed on Dec. 22, 2021, which is a Continuation of U.S. application Ser. No. 17/548,735, filed on Dec. 13, 2021. To the extent appropriate a claim of priority is made to each of the above-listed applications.

FIELD OF TECHNOLOGY

This disclosure generally relates generally to games of skill, and more particularly the use of sensors to allow players to participate in exercise challenges.

BACKGROUND

Games of skill are games that are played by a player in which the outcome of the game is primarily based on physical or mental skill of the player rather than merely chance. Games of chance are those in which the outcome is based primarily on chance. To be successful in games of skill certain judgment, skill, or deftness of the player is needed. Games of skill dependent upon physical activity may require successful individuals to have strength, flexibility, or other physical traits.

Sensor technology for sensing environmental factors, movement, and physiological functions has been used in many ways and is readily available. Sensor technology may be available in small embodiment sizes and may have varying precision and accuracy. Sensors have been implemented in many applications. For example, smartwatches may contain sensors that can sense location using GPS, sense barometric pressure, steps walked, blood oxygen levels, navigational directions, gyroscopic movement, heart rate, and many other data types. Environmental factors such as barometric pressure, elevation, ambient light, and others may be sensed. Movements that may, for example, be sensed include navigational direction, GPS, steps taken, gyroscopic movements, acceleration, and other data types. Physiological functions may include heart rate, blood oxygen levels, and other date types.

The use of rudimentary methods to challenge each other to physical and sporting competitions have long been appreciated. For example, two people may challenge each other to a running competition wherein the winner receives money. A rudimentary method to carry out this competition is to have a starting line and an endpoint. Whoever runs from the start to the end in less time wins. Though sensor technology has been around for many years, the use of senor technology in games of skill related to exercise has been limited.

SUMMARY

The present invention disclosed herein includes a method to use sensors for games of skill. More specifically, a method to use sensors for games of skill related to physical exercise is disclosed herein. The method includes the participation of two or more players. The players participate in a game of skill. The method to use sensors for games of skill is how the players participate. The method to use sensors for games of skill may be referenced herein as the method. Alternatively, the method may be referenced as a method to use sensors.

Players participate in the game of skill by challenging one or more other players. A game is referenced as a challenge herein. The method to use sensors comprises of the steps of choosing an opponent, selecting an event with at least one metric, determining a wager, physically competing in the challenge, sensing the metric, verifying the metrics and the opponents, and settling the wager. Choosing an opponent, selecting an event, and determining a wager is considered the requesting portion of the method. Competing in the challenge, sensing the metric, and verifying is considered the executing portion of the method. Settling the wager is considered the closing of the method.

A first player may challenge a second player to a challenge using the method. For example, the first player in the requesting portion of the method may take the step of choosing an opponent, selecting an event, and determining a wager. The second player may communicate to the first player to agree to the request of the first player. The first player and second player then enter the executing portion of the the method wherein each player is competing in the challenge, sensors are sensing the metrics, and results are verified. Upon completion of the executing portion of the method, the closing of the method occurs and the challenge undergoes settling wherein the player with the winning metrics receives the results of the wager.

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Figures Detail

Figure 1:
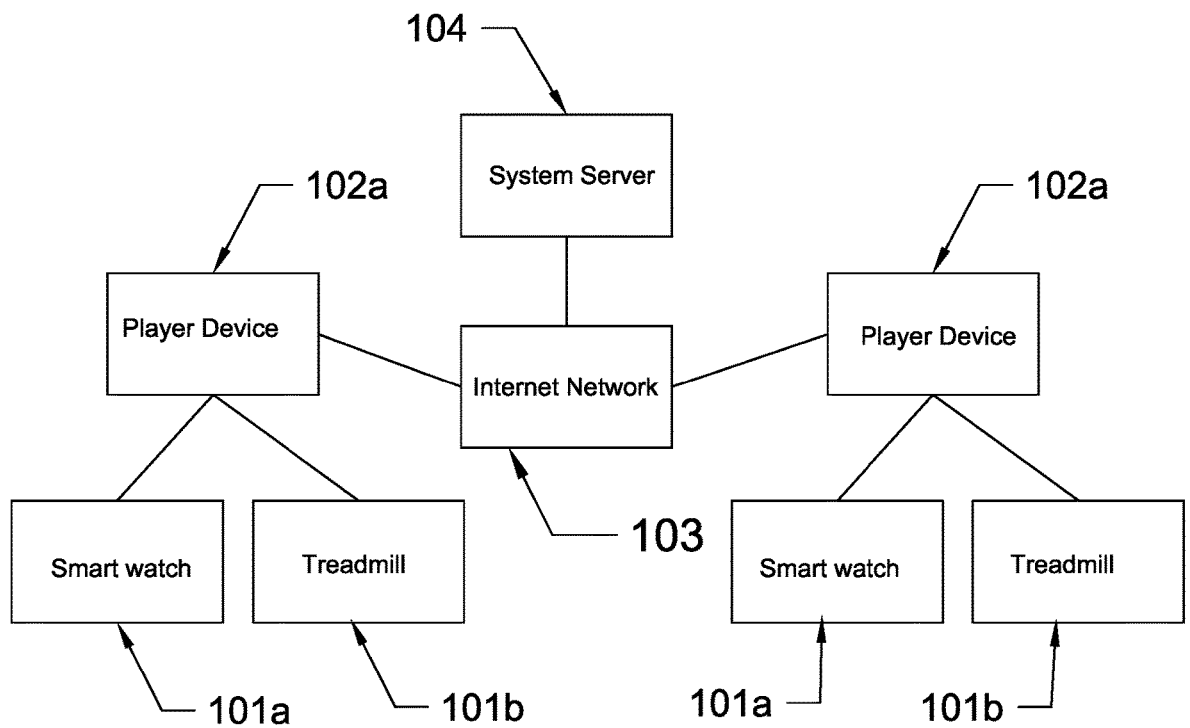
FIG. 1 is a simplified block diagram showing the relation between elements of the internet and sensors.

FIG. 1 is a simplified block diagram showing the relation between elements of the internet and sensors. The method disclosed herein employs the use of at least two player devices connected to an internet network 103. A first player device 102a and a second player device 102b is connected to the internet network 103. The first player device 102a, the second player device 102b, and any other player devices may be referenced as a player device 102. A system server 104 is connected to the internet network 103. Sensors 101 may be attached to a player device 102. A shown in FIG. 1, the first player users the first player device 102a along with sensors 101 attached to the first player device 102a. The second player uses the second player device 102b along with sensors 101 attached to the second player device 102b.

A player device 102 may be a smartphone, a tablet, or another device that can access the internet network 103. Connected to each player device 102 is one or more sensors 101. For example, in the exemplary block diagram of FIG. 1, a first sensor 101a in the form of a smartwatch is connected to the first player device 102a. Further, a second sensor 101b in the form of a smart exercise treadmill is connected to the first player device 102a. A third sensor 101c in the form of a smartwatch is connected to the second player device 102b. Further, a fourth sensor 101d in the form of a smart exercise treadmill is connected to the second player device 102b. The sensors 101 may alternatively be connected to the internet network 103 directly as opposed to being connected to a player device 102.

The present invention disclosed herein includes a method to use sensors 101 for games of skill. More specifically, a method to use sensors 101 for games of skill related to physical exercise is disclosed herein. The method includes the participation of two or more players. The players participate in a game of skill. The method to use sensors 101 for games of skill is how the players participate. The method to use sensors 101 for games of skill may be referenced herein as the method. Alternatively, the method may be referenced as a method to use sensors 101.

Figure 2:
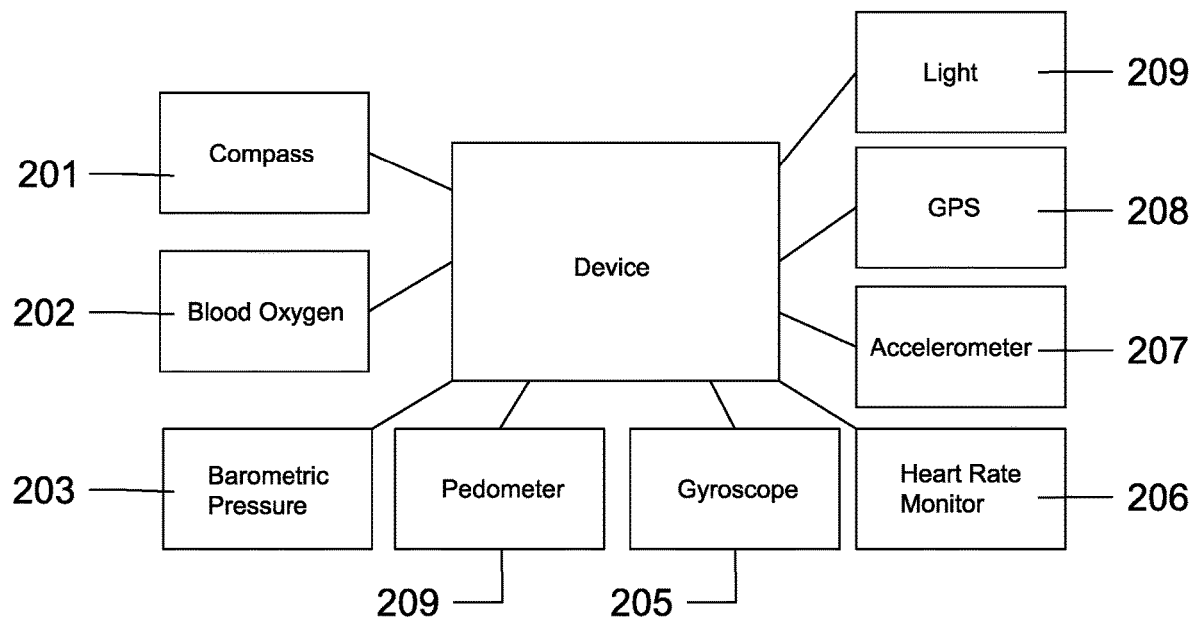
FIG. 2 is a simplified block diagram showing exemplary sensor types which may be attached to a player device.

FIG. 2 is a simplified block diagram showing exemplary sensor types which may be attached to a player device 102. Exemplary sensors 101 which are shown include a compass 201, a blood oxygen sensor 202, a barometric pressure sensor 203, a pedometer 204, a gyroscope 205, a heart rate monitor 206, an accelerometer 207, a GPS 208, a light sensor 209, as well as other such sensors. These sensors 101 provide data for the method for which metrics can be used to determine the results of a challenge. Sensors 101 may also include sensors for golfing simulators. One sensor may include many different sensors capable of reading different metrics. For example, a smartwatch might have a blood oxygen sensor 202, a barometric pressure sensor 203, a pedometer 204, a gyroscope 205, a heart rate monitor 206, an accelerometer 207, a GPS 208, a light sensor 209, as well as other such sensors.

Figure 3:
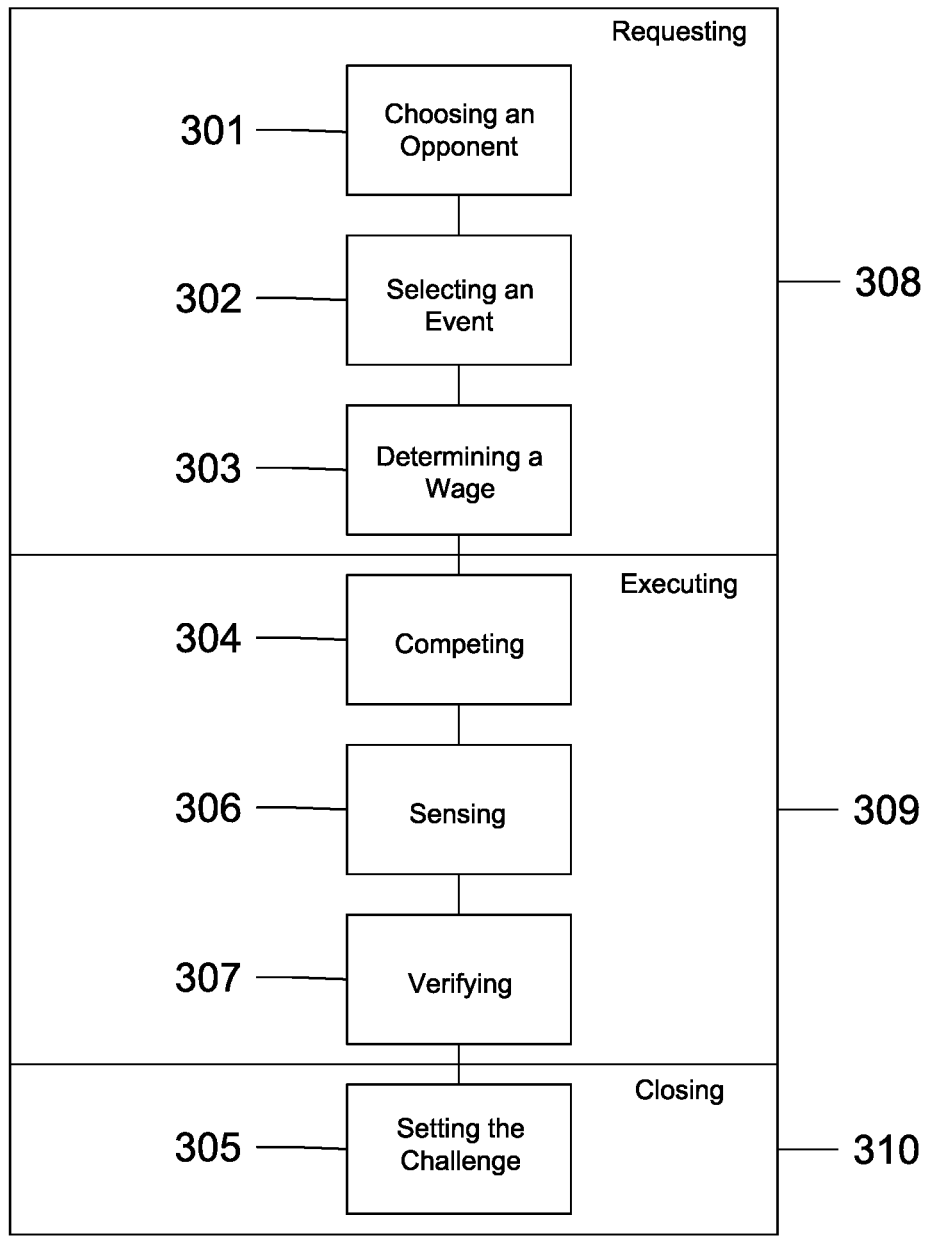
FIG. 3 is a simplified block diagram showing the steps of the method to use sensors for games of skill.

FIG. 3 is a simplified block diagram showing the steps of the method to use sensors 101 for games of skill. Players participate in the game of skill by challenging one or more other players. A challenge comprises an event with at least one metric and a wager. The method to use sensors 101 comprises of the steps of choosing 301 an opponent, selecting 302 an event with at least one metric, determining 303 a wager, physically competing 304 in the challenge, sensing 306 the metric, verifying 307 the metrics and the opponents, and settling 305 the wager. Choosing 301 an opponent, selecting 302 an event, and determining 303 a wager is considered the requesting 308 portion of the method. Competing 304 in the challenge, sensing 306 the metric, and verifying 307 is considered the executing 309 portion of the method. Settling 305 the wager is considered the closing 310 of the method.

A first player may challenge a second player to a challenge using the method. For example, the first player in the requesting 308 portion of the method may take the step of choosing 301 an opponent, selecting 302 an event, and determining 303 a wager. The second player may communicate to the first player to agree to the request of the first player. The first player and second player then enter the executing 309 portion of the the method wherein each player is competing 304 in the challenge, sensors are sensing 306 the metrics, and results undergo a verifying 307 step. Upon completion of the executing 309 portion of the method, the closing 310 of the method occurs. The challenge undergoes settling 305 wherein the player with the winning metrics receives the wager results.

The requesting 308 portion of the method may take the step of choosing 301 an opponent, selecting 302 an event, and determining 303 a wager. In an exemplary process, a first player would choose an opponent, select an event, and determine a wager. The first player would then send this information to an opponent. This information is considered the requesting 308 of a challenge. A second player may take the act of accepting the challenge. If a second player accepts the challenge, the wager would be placed in escrow and the method would proceed to the executing 309 portion. Alternatively, if the challenge is against a virtual opponent 601, the system server 104 may accept the challenge. The opponent may alternatively reject the challenge, at which point the method ends.

Figure 6:
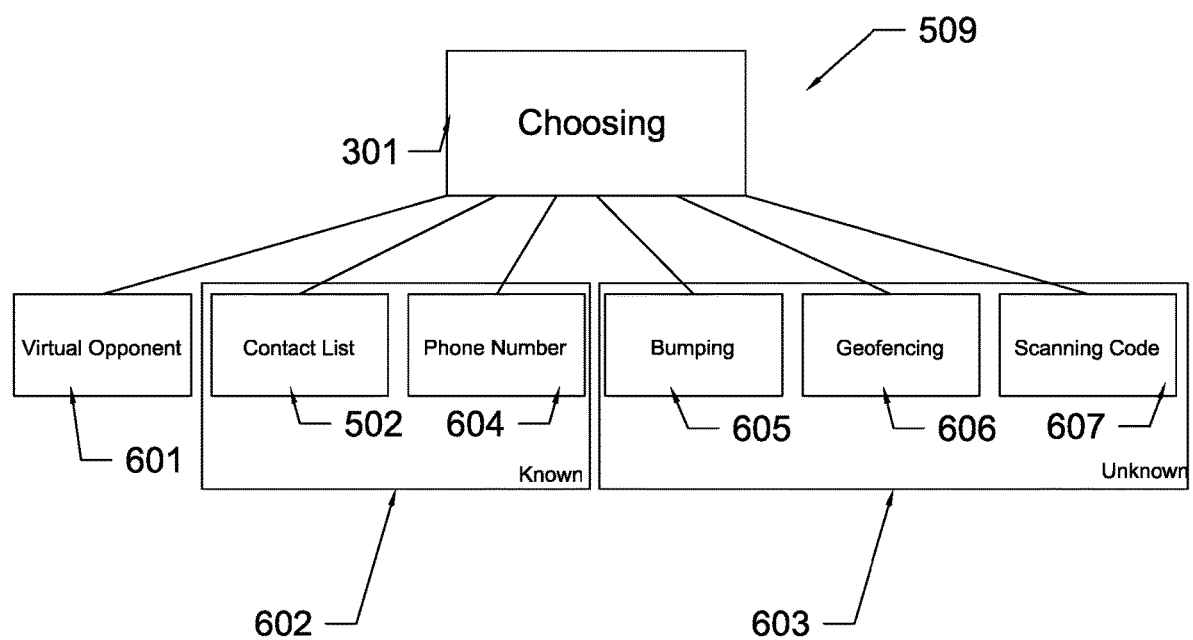
FIG. 6 is a simplified block diagram showing the requesting portion of the method.

Choosing 301 an opponent is discussed more in relation to FIG. 6.

Figure 7:
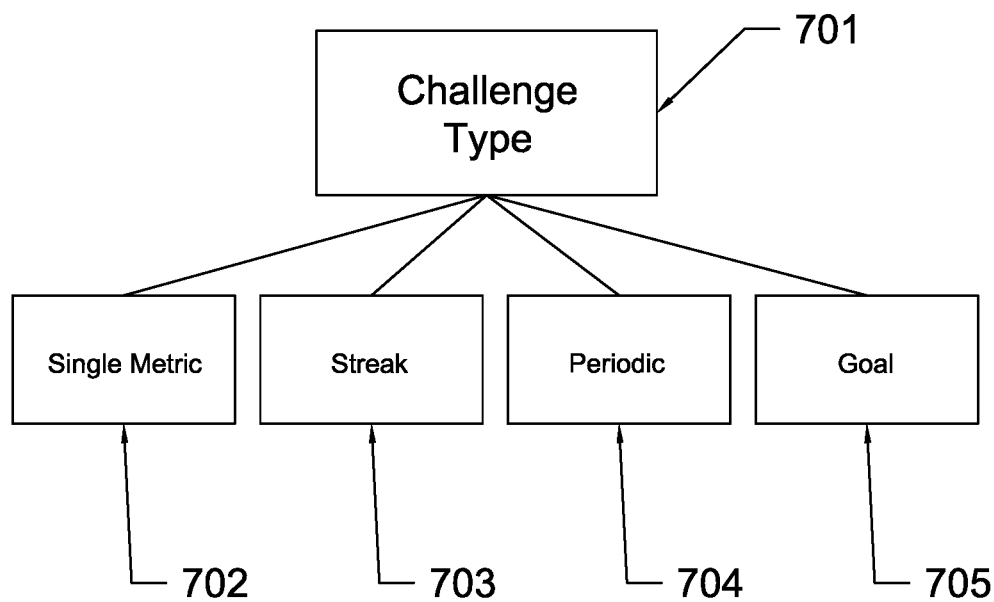
FIG. 7 is a simplified block diagram showing exemplary types of events that can be utilized for a challenge.
Figure 8:
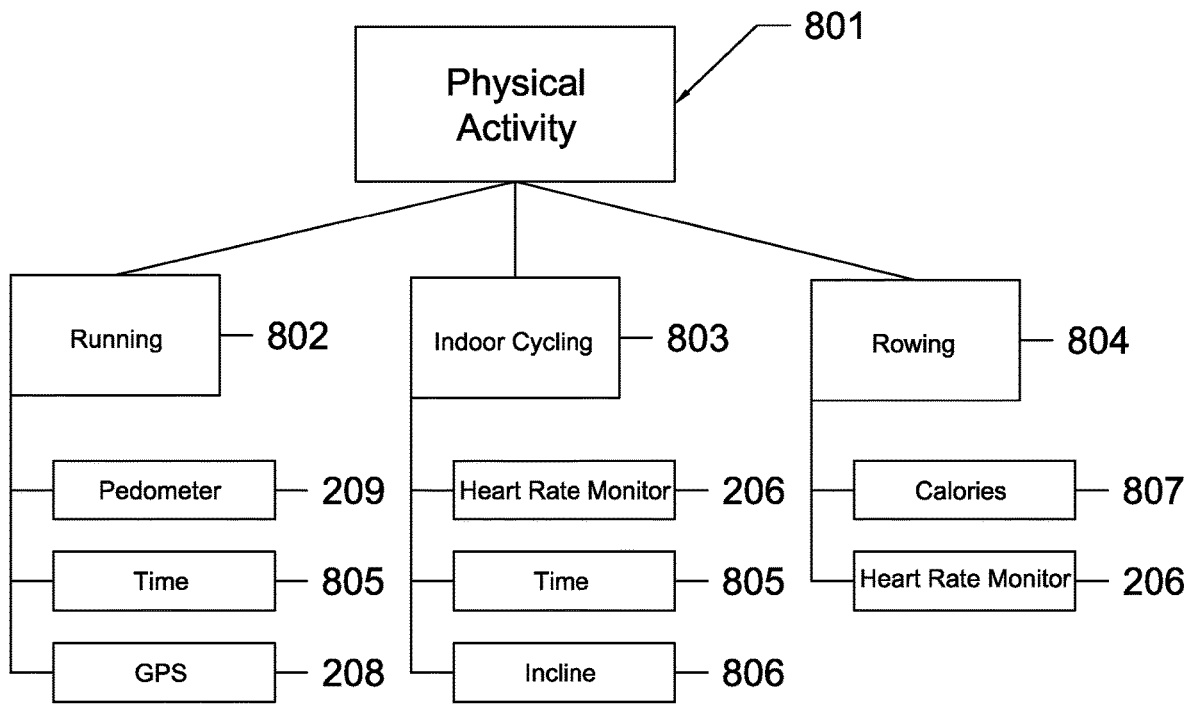
FIG. 8 is a simplified block diagram showing exemplary types of physical activities that can be utilized for a challenge.

Selecting 302 an event is discussed more in relation to FIGS. 7 and 8.

Determining 303 a wager is the act of picking the reward which will be distributed to the winning player in the settling 305 step. A wager is something of value that is contributed to an escrow and held in escrow until settling 305. The wager may, for example, be a $20.00 contributed from both a first player and a second player. The total wager in this example would be $40.00. The winning player may receive the $40.00 in the settling 305 step of the method. The winning player may be distributed the wager in any manner reasonable to the type of wager. The wager may come in forms, including a monetary amount, a cryptocurrency, a non-fungible token, an acquired coupon, an agreement to purchase something, an act of service, or any other item which could be a wager. Some in the industry may consider this wager as an item being gambled, but the disclosed invention is directed primarily to a game of skill. Determining 303 a wager may be done by a player activating the appropriate commands on a player device 102.

The executing 309 portion of the method may take the steps of competing 304 in the challenge, sensing 306 the metric, and verifying 307. The challenge represents the event selected, the wager determined, and the metrics which will be sensed.

Competing 304 is the step wherein a player physically participates in the physical activity selected as the event. An example may be an event wherein the physical activity is running. The metric might be calories burned while running a mile in this example. Competing is the actual physical act of a player running the mile.

Sensing 306 the metric is the step wherein data is obtained from sensors 101. The data may be used by a player device 102 to establish a metric. The established metric is used to compute the result. The data may be obtained in a raw format or may be obtained using an applicable programming interface (API). An API may be used when the manufacture of a sensor has provided for an API. When an API is used, the data may be obtained in a format providing the final measurement for the desired metric. For example, a heart rate monitor 206 may have an API that allows the player's heart rate to be obtained from the heart rate monitor 206 by a player device 102. The heart rate monitor 206 may be on a smartwatch. If raw data was obtained from sensors 101, the raw data would need to be processed into the final measurement for the desired metric. One or more metrics may be used in a challenge.

Verifying 307 the metrics and the opponents is the step wherein the method accounts for anomalies in the metrics and takes measures to limit potential fraudulent behavior. Verifying 307 will be detailed more with FIG. 9.

The closing 310 portion of the method is when the step of settling 305 occurs wherein the player with the winning metrics receives the wager results. Closing 310 and settling 305 will be detailed more with FIG. 10.

Figure 4:
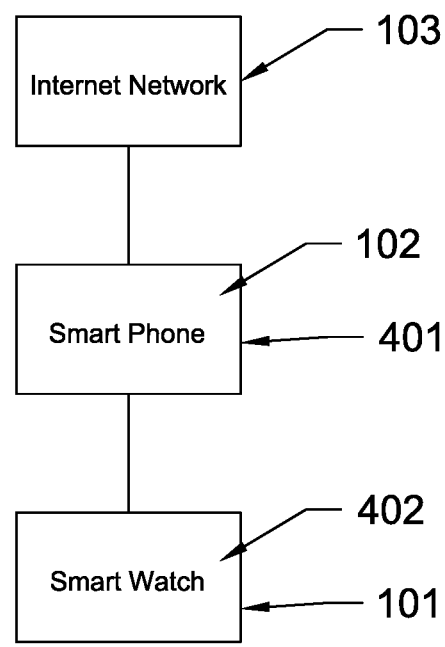
FIG. 4 is a simplified block diagram showing how a player device may be connected to an internet network.

FIG. 4 is a simplified block diagram showing how a player device 102 may be connected to an internet network 103. In this example, the player device 102 is a smartphone 102. The smartphone 102 is connected to a smartwatch 101. The smartwatch 101 may have many different sensors 101. The smartphone 102 may also have sensors 101. For example, the smartwatch 101 may have a heart rate monitor 206, a gyroscope 205, a pedometer 204, a blood oxygen sensor 202, and other sensors. The smartphone 102 may have a GPS 208 and a compass 201. The sensors 101 may be integrated into the player device 102. Data for the challenge metrics may be used from sensors 101 on either the smartwatch 101 or the smartphone 102, or both.

Figure 5:
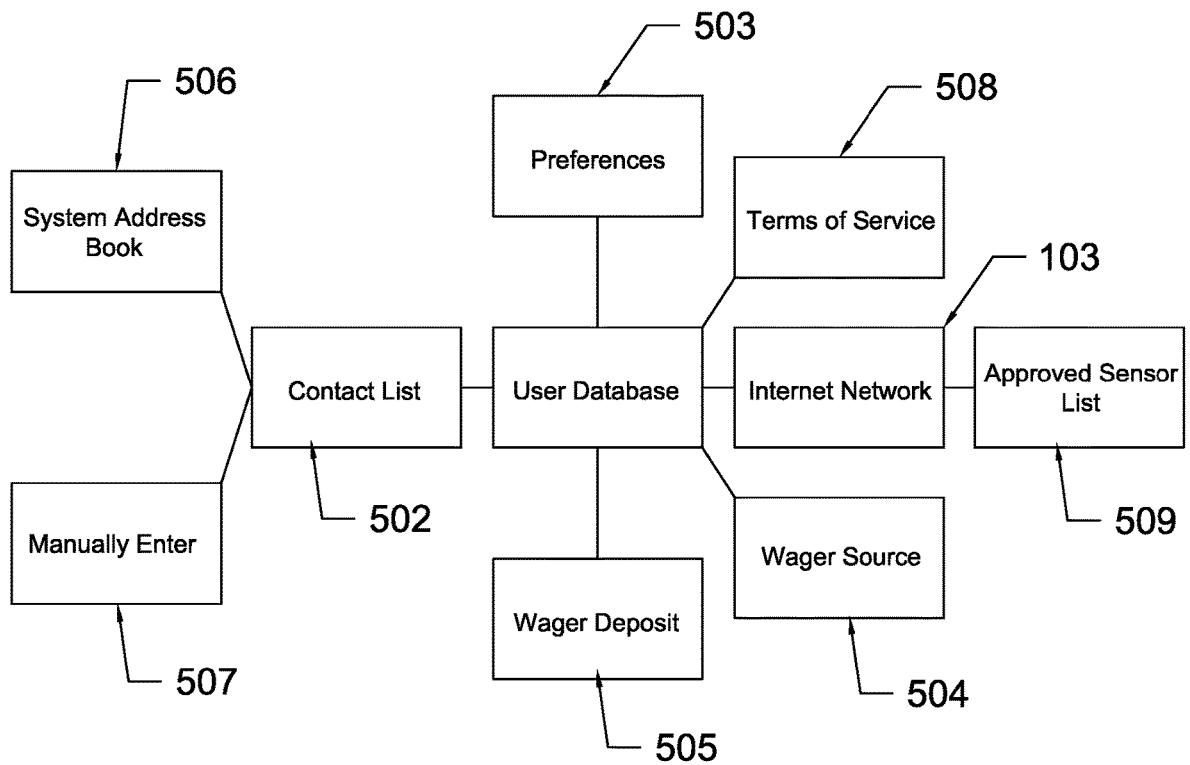
FIG. 5 is a simplified block diagram showing information provided for the method from a player.

FIG. 5 is a simplified block diagram showing information provided for the method from a player. When a player wishes to use the method, the player may prepare to use the method using a player device 102. For example, a player may wish to use a smartphone for the method. Therefore, the player may download an application onto the player's smartphone. Then, the player may access the application on the smartphone. In the application, the player may create an online identity to participate in the method. The online identity is used to save content, provide direction as to how a wager is to be submitted and received, and a name with which the player may communicate.

An avatar may be integrated with the online identity, reflecting certain metrics derived from sensors 101. An avatar is a digital representation of a person customized by a player. An avatar could be a digital representation of the player. The avatar may reflect a face, or the avatar may reflect a full-body image. An avatar within the application on the smartphone may reflect a event that a player is executing. Data from sensors 101 and data from the challenge may be used to cause the avatar to reflect different representations. For example, a player in a weightlifting event may have an avatar representing a weightlifter. An application on a player device may be displaying the avatar.

The online identity is stored on an online user database 501. The user database 501 is connected to the internet network 103. A player may provide information to the user database 501, including a contact list 502, preferences 503, a wager source 504, wager deposit information 505, and other information. An application on the smartphone may further allow a player to approve terms of service 508 and communicate approved sensors 509 for use with the application and the method.

A contact list 502 may be filled by connecting the contact list 502 to a system address book 506 on a smartphone. Alternatively, a player may manually enter 507 information into the contact list 502. The contact list 502 may primarily be filled with other players that the player could challenge.

A wager source 504 may come in forms, including a monetary amount, a cryptocurrency, a non-fungible token, an acquired coupon, an agreement to purchase something, an act of service, or any other item which could be wager. Wager deposit information 505 are instructions provided by the player that direct where any winnings will be sent.

Approved sensors 509 are sensors 101 approved by the system server 104 for use with the method.

FIG. 6 is a simplified block diagram showing the requesting 308 portion of the method. Specifically, FIG. 6 shows the choosing 301 step of the method. Choosing 301 is where a first player picks the opponent or opponents the first player would like to challenge. The first player may choose an opponent, including a virtual opponent 601, a known opponent 602, or an unknown opponent 603. For each type of opponent, there may be multiple opponents. The first player may choose the opponent by activating the appropriate inputs on the first player device 102*a*.

A virtual opponent 601 may be the system server 104. In this embodiment, the first player effectively places a wager against themselves, and the challenge is to achieve a certain challenge. If the first player does not achieve the challenge, the system server directs where the wager is distributed.

A known opponent 602 may be a second player that is in the contact list 502 or from a phone number 604 that has been entered into the first player device 102*a*.

An unknown opponent 603 may be a second player that is chosen by bumping 605 a second player device 102*b*, geofencing 606, or scanning 607 a code. Bumping 605 is the act of holding a first player device 102*a* adjacent to a second player device 102*b* while both have an application cable of operating the method open. Bumping allows a first player to challenge an unknown second player who is in the same proximity. A second player may accept a challenge by activating an acceptance input on the second player device. Geofencing 606 allows the first player device 102*a* to challenge a second player at a particular geofenced location. For example, a first player may challenge a second player at a gym which they are both located. Scanning 607 a code is the act of a first player scanning a code, such as a QR code, that activates a challenge with a one or more other players who have also scanned the code. For example, players could agree to a challenge as to who can run a mile the fastest by scanning a QR code. Multiple players could scan the code, and all the players are part of the challenge.

FIG. 7 is a simplified block diagram showing exemplary types of events that can be selected for a challenge. An event has a challenge type 701 and a physical activity 801. Selecting 302 an event is an act a first player takes to pick the challenge type 701 and the type of physical activity 801. FIG. 7 specifically shows the challenge type 701 for the event. Wager types may include a single metric 702, a streak 703, a periodic 704, a goal 705.

A single metric 702 is one wherein at least two players challenge each other to a better result on one metric. For example, a single metric 702 challenge could be one where the metric is, who burns more calories or who can run further in five minutes.

A streak 703 is a challenge wherein two players challenge the other as to who can perform a physical task for a longer metric. For example, a streak 703 challenge could be one where the metric is who can run for a longer time period.

A periodic 704 challenge is one wherein the challenge is who can do something the most number of times. For example, a periodic 704 challenge could be one where the metric is who can do the most push-ups, the most repetitions of an exercise, run the furthest over so many days, burn the most calories over the course of a week, or other similar concepts.

A goal 705 challenge is one wherein the challenge is to accomplish something first. For example, a goal 705 challenge could be one where the metric is which player can lose 5 pounds first or who can run a mile faster.

FIG. 8 is a simplified block diagram showing exemplary types of physical activity 801 that can be selected for a challenge. Physical activities can be any type of physical activity 801 that can be sensed with sensors 101. The sensors 101 provide data for the metrics. Examples of physical activities include running 802, indoor cycling 803, or rowing 804. Running 802 may be tracked by sensors 101, including a pedometer 204, time 805, and GPS 208. Indoor cycling 803 may be tracked by sensors, including a heart rate monitor 206, a time 805, and an incline sensor 806. An incline sensor 806 may be integrated into the indoor cycle and the indoor cycle connected to a player device 102. Rowing 804 may be tracked by sensors 101, including a calories sensor 807 and a heart rate monitor 206. A calories sensor 807 may comprise of multiple sensors 101 which use an API to process the data to calories.

Figure 9:
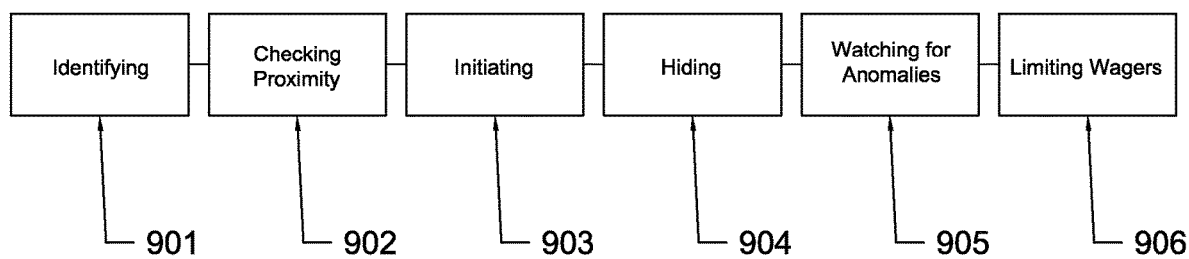
FIG. 9 is a simplified block diagram showing the verifying step of the method.

FIG. 9 is a simplified block diagram showing the verifying 307 step of the method. Verifying 307 is comprised of identifying 901, checking 902 proximity, initiating 903 the challenge, hiding 904 the metrics, watching 905 for anomalies, and limiting 906 wagers. Verifying 307 the established metrics and the players is the step wherein the method accounts for anomalies in the metrics and takes measures to limit potential fraudulent behavior.

Identifying 901 is the step of ensuring that the player executing 309 the method is the player that is associated with the online identity. Identifying 901 may be performed by using facial recognition. Facial recognition is one methodology for identifying 901. Many smartphones and devices have facial recognition capabilities. Prior to competing 304 a player must be identified.

Checking 902 proximity to the sensors 101 being used in a challenge is a step wherein the method ensures the player is the one using the sensors. Checking 902 may be performed with wearable sensors by taking a picture of the wearable sensor being worn by a player. Wearable sensors, such as smartwatches, can display a unique code, such as a QR Code, on its screen. The player may take a picture with a player device 102 showing the unique code and the smartwatch. A smartwatch can detect if the smartwatch is removed from the player. If the smartwatch is removed from the player after competing 304 has started, the method flags the activity and the player who removed the watch may be disqualified.

Initiating 903 is the act of the player activating the competing 304 step by inputting a relevant command to the player device. Initiating is inputting a relevant command to begin the physical activity defined by the selecting 302 of an event. An example of initiating 903 is a player pressing a button on a smartwatch that picks the particular event.

Hiding 904 is a method function wherein the metrics sensed by the sensors 101 are not shared with other players until the competing 304 portion of the method is complete. Hiding 904 helps ensure that players cannot try to cheat to modify their metrics just barely to beat the opponent.

Watching 905 for anomalies is the step wherein the system server 104 flags metric data inconsistent with a player's typical metric data, inconsistent with other sensor data, or inconsistent with exercise norms.

Limiting 906 wagers is the function of the system server 104 restricting players from determining 303 a wager that is greater than a certain value. For example, the system server 104 may limit determining 303 a wager to a value of $100. This value could be any value.

Figure 10:
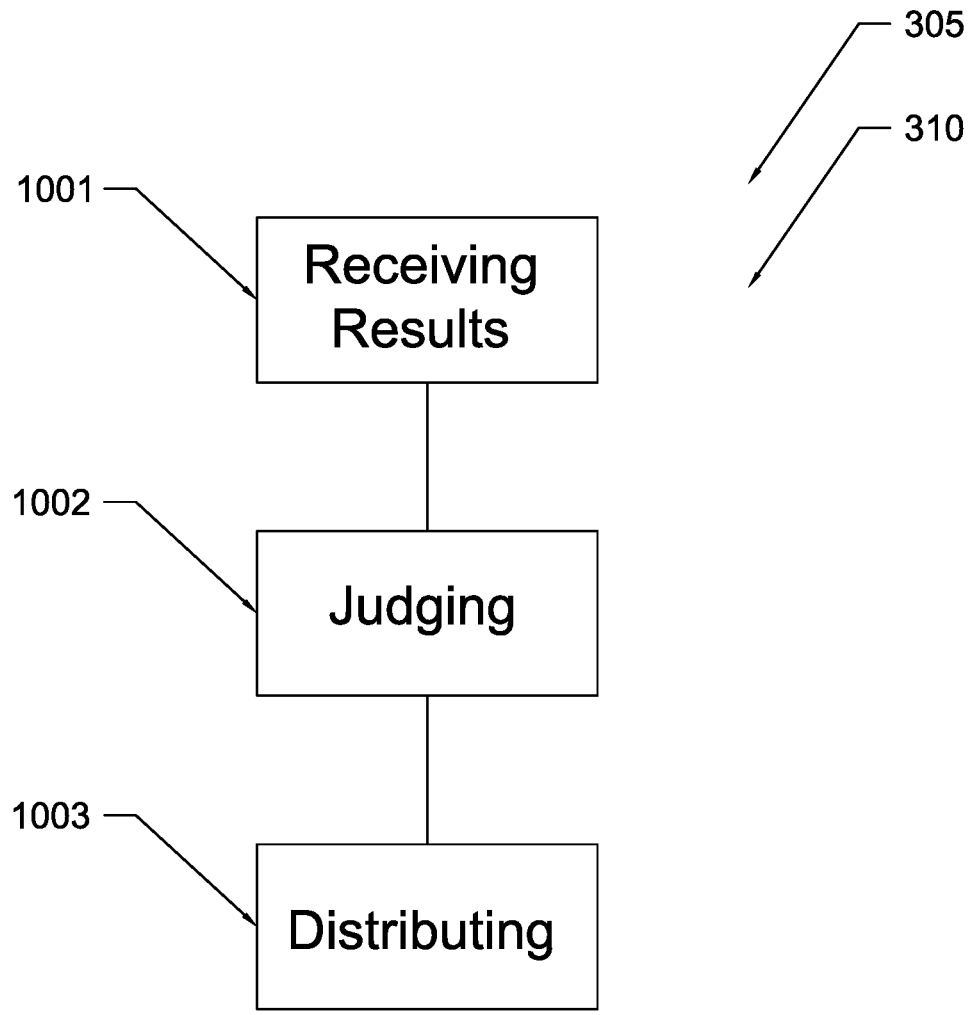
FIG. 10 is a simplified block diagram showing the settling step of the method.

FIG. 10 is a simplified block diagram showing the settling 305 step of the method. Settling 305 comprises receiving 1001 the results, judging 1002 the winner, and distributing 1003 the wager. Receiving 1001 the results is the step wherein the system server 104 receives the established metrics from all of the players competing 304 in a challenge. Established metrics are uploaded from the player devices to the system server 104. Once all of the results are received, the established metrics undergo judging 1002 by the system server 104 with the winner based on the determining 303 of a wager step and the metrics. Judging 1002 is the act of establishing the winning player or players. Based on the judging 1002, the system server 104 proceeds in distributing 1003 all or part of wager to the winning player, players, or other parties. Deductions may be taken from the wager in accordance with terms and conditions and other terms established in the determining 303 step. The winning player may be distributed the wager less any deductions. Less is the act of subtracting the deductions.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A computer-implemented method to use sensors for a game of skill, the method comprising:
    initiating a fitness challenge by a first player with at least one additional player, wherein the first player is associated with a user identity stored in a user database;
    sensing a metric with a smartwatch of the first player while the first player is physically participating in a physical activity of a selected fitness challenge while wearing the smartwatch, wherein data related to the metric is obtained from the smartwatch, the data obtained from the smartwatch used to determine an established metric from the first player physically participating in the physical activity of the selected fitness challenge, the data comprising a physiological function and a movement of the first player, wherein the physiological function comprises at least one of a heart rate and a blood oxygen level;
    uploading the established metric from a smartphone associated with the first player;
    verifying the established metric, wherein verifying the established metric includes:
        checking a proximity of the smartwatch to the first player including monitoring whether the smartwatch is removed from the first player; and
        identifying that the first player is associated with the user identity by using sensors of the smartphone associated with the first player;
    checking for anomalies in the uploaded established metric from the smartwatch while the first player is physically participating in the physical activity of the selected fitness challenge;
    comparing the established metric from the first player to an established metric from the at least one additional player; and
    determining a winner of the fitness challenge based on the comparison of the established metrics.

2. The method of claim 1, further comprising sensing a smartwatch of at least one additional player is within a predefined distance from the smartwatch of the first player such that at least one additional player may accept the fitness challenge from the first player to compete in the physical activity of the selected fitness challenge.

3. The method of claim 1, further comprising verifying the established metric by identifying the first player using facial recognition.

4. The method of claim 1, wherein checking the proximity comprises taking a picture of the smartwatch with the smartphone.

5. The method of claim 4, further comprising:
    disqualifying the first player when a unique code displayed on the smartwatch is not detected in the picture.

6. The method of claim 1, further comprising:
    disqualifying the first player in response to removal of the smartwatch.

7. The method of claim 1, wherein checking for anomalies includes checking whether metric data is inconsistent with the first player's typical metric data, inconsistent with other sensor data, or inconsistent with exercise norms.

8. The method of claim 1, wherein identifying that the first player is associated with the user identity by using sensors of the smartphone associated with the first player includes using facial recognition.

9. A system using sensors for a game of skill, the system comprising:
    a smartwatch, the smartwatch configured to sense a metric of a first player while the first player is physically participating in a physical activity of a selected fitness challenge while wearing the smartwatch, wherein data related to the metric is obtained from the smartwatch, the data obtained from the smartwatch used to determine an established metric from the first player physically participating in the physical activity of the selected fitness challenge, the data comprising a physiological function and a movement of the first player, wherein the physiological function comprises at least one of a heart rate and a blood oxygen level;
    a smartphone, the smartphone configured to upload the established metric associated with the first player;
    at least one processing device; and
    at least one non-transitory computer readable storage device, the at least one computer readable storage device storing data instructions, which when executed by the at least one processing device, cause the system to:
        initiate a fitness challenge by the first player with at least one additional player, wherein the first player is associated with a user identity stored in a user database;
        verify the established metric, wherein verify the established metric includes:
            check a proximity of the smartwatch to the first player including monitor whether the smartwatch is removed from the first player; and
            identify that the first player is associated with the user identity by using sensors of the smartphone associated with the first player;
        check for anomalies in the uploaded established metric from the smartwatch while the first player is physically participating in the physical activity of the selected fitness challenge;
        compare the established metric from the first player to an established metric from the at least one additional player; and determine a winner of the fitness challenge based on the comparison of the established metrics.

10. At least one non-transitory computer readable storage device storing data instructions, which when executed by at least one computing device, cause the at least one computing device to:
- initiate a fitness challenge by a first player with at least one additional player, wherein the first player is associated with a user identity stored in a user database;
- sense a metric with a smartwatch of the first player while the first player is physically participating in a physical activity of a selected fitness challenge while wearing the smartwatch, wherein data related to the metric is obtained from the smartwatch, the data obtained from the smartwatch used to determine an established metric from the first player physically participating in the physical activity of the selected fitness challenge, the data comprising a physiological function and a movement of the first player, wherein the physiological function comprises at least one of a heart rate and a blood oxygen level;
- upload the established metric from a smartphone associated with the first player;
- verify the established metric, wherein verify the established metric includes:
  - check a proximity of the smartwatch to the first player including monitor whether the smartwatch is removed from the first player; and
  - identify that the first player is associated with the user identity by using sensors of the smartphone associated with the first player;
- check for anomalies in the uploaded established metric from the smartwatch while the first player is physically participating in the physical activity of the selected fitness challenge;
- compare the established metric from the first player to an established metric from the at least one additional player; and
- determine a winner of the fitness challenge based on the comparison of the established metrics.

* * * * *